(12) United States Patent
Padeski et al.

(10) Patent No.: US 8,498,082 B1
(45) Date of Patent: Jul. 30, 2013

(54) DSA SUSPENSION WITH IMPROVED MICROACTUATOR STROKE LENGTH

(75) Inventors: Jason Padeski, Murrieta, CA (US); Amaninder Singh Dhillon, Ayutthaya (TH)

(73) Assignee: Magnecomp Corporation, Murrieta, CA (US)

( * ) Notice: Subject to any disclaimer, the term of this patent is extended or adjusted under 35 U.S.C. 154(b) by 197 days.

(21) Appl. No.: 13/069,812

(22) Filed: Mar. 23, 2011

(51) Int. Cl.
*G11B 21/10* (2006.01)

(52) U.S. Cl.
USPC ........................................ 360/294.4

(58) Field of Classification Search
USPC .......................................... 360/294.3, 294.4
See application file for complete search history.

(56) References Cited

U.S. PATENT DOCUMENTS

| | | | |
|---|---|---|---|
| 6,335,849 B1 | 1/2002 | Khan et al. | |
| 6,594,104 B2 | 7/2003 | Tokuyama et al. | |
| 6,661,619 B2 | 12/2003 | Nishida et al. | |
| 6,791,783 B2 * | 9/2004 | Nakagawa | 360/75 |
| 6,856,075 B1 | 2/2005 | Houk et al. | |
| 6,870,377 B2 | 3/2005 | Thomsen | |
| 7,167,344 B2 * | 1/2007 | Nakagawa et al. | 360/294.4 |
| 7,658,001 B1 | 2/2010 | Houk | |
| 7,682,879 B2 | 3/2010 | Echols et al. | |
| 8,144,435 B2 * | 3/2012 | Greminger et al. | 360/294.4 |
| 8,248,735 B2 * | 8/2012 | Fujimoto et al. | 360/294.4 |
| 8,248,736 B2 * | 8/2012 | Hanya et al. | 360/294.4 |
| 8,363,361 B2 * | 1/2013 | Hanya et al. | 360/294.4 |
| 8,369,047 B2 * | 2/2013 | Fujimoto et al. | 360/294.4 |
| 2009/0080117 A1 * | 3/2009 | Shimizu et al. | 360/294.4 |
| 2009/0086379 A1 * | 4/2009 | Hanya et al. | 360/294.4 |
| 2010/0073824 A1 * | 3/2010 | Nojima | 360/294.4 |
| 2010/0097727 A1 | 4/2010 | Greminger | |
| 2010/0208390 A1 | 8/2010 | Hanya et al. | |
| 2011/0228425 A1 * | 9/2011 | Liu et al. | 360/244.2 |
| 2011/0242708 A1 * | 10/2011 | Fuchino | 360/294.3 |
| 2012/0002329 A1 * | 1/2012 | Shum et al. | 360/294.4 |

\* cited by examiner

*Primary Examiner* — Angel Castro
(74) *Attorney, Agent, or Firm* — Intellectual Property Law Offices of Joel Voelzke, APC

(57) ABSTRACT

In a dual stage actuated (DSA) suspension, a PZT microactuator is electrically and mechanically bonded to the rest of the suspension by non-conductive epoxy on the front and rear bottom faces of the PZT, by conductive epoxy that bridges a gap between the top face of the PZT which defines the ground electrode and an adjacent metallic and grounded portion of the suspension, and further by additional non-conductive epoxy that bridges the gap and which at least partly overlies the conductive epoxy. The additional non-conductive epoxy increases the effective stroke length of the PZT.

19 Claims, 5 Drawing Sheets

DSA SUSPENSION WITH IMPROVED MICROACTUATOR STROKE LENGTH

CROSS-REFERENCE TO RELATED APPLICATIONS

None.

BACKGROUND OF THE INVENTION

1. Field of the Invention

This invention relates to the field of suspensions for disk drives. More particularly, this invention relates to the field of dual stage actuated (DSA) suspensions and methods of attaching the microactuators used therein to the suspension.

2. Description of Related Art

Magnetic hard disk drives and other types of spinning media drives such as optical disk drives are well known. FIG. 1 illustrates a typical prior art hard disk drive and suspension for which the present invention is applicable. The prior art disk drive unit 100 includes a spinning magnetic disk 101 containing a pattern of magnetic ones and zeroes on it that constitutes the data stored on the disk drive. The magnetic disk is driven by a drive motor (not seen in the figure). Disk drive unit 100 further includes a disk drive suspension 105 to which a magnetic head slider 109 is mounted proximate a distal end of load beam 107. Suspension 105 is coupled to an actuator arm 103, which in turn is coupled to a voice coil motor 112 that moves the suspension 105 arcuately in order to position head 109 over the correct data track on data disk 101. Magnetic head slider 109 is carried on a gimbal which allows slider 109 to pitch and roll so that the slider follows the data track on the disk, and allows for such variations as vibrations of the disk, inertial events such as bumping, and irregularities in the disk's surface.

Both single stage actuated disk drives, which include only voice coil motor 112, and dual stage actuated (DSA) disk drives, which also include one or more microactuators somewhere on the suspension to effect fine arcuate movements of the head slider, are well known in the art. An example of a DSA type head suspension is given in U.S. Pat. No. 7,375,930 issued to Yang et al. and assigned to the assignee of the present application. Another example of a DSA suspension is given in Patent Publication No. US 2009/00886379 by Hanya et al. which is incorporated by reference herein. FIG. 3 of Hanya et al. is redrawn and relabeled as FIG. 2 hereto. In the Hanya et al. suspension, two PZT microactuators 21 are attached to suspension 20 at an actuator plate 23 that is formed integral with base plate 22. Conductive adhesive 24 provides an electrical connection between PZTs 21 and actuator plate 23. Referring now to FIG. 4 of Hanya et al., a known method of electrically and mechanically attaching the PZT microactuators to the suspension is to mechanically affix the PZTs to the microactuator plate by a non-conductive adhesive 51. A small amount of conductive adhesive 53a is then placed on top such that it touches both the top surfaces of the PZT's metallized top face and the actuator plate, thus bridging the gap therebetween and forming a ground connection to the PZT's negative electrode. The positive (driving voltage) connection to the PZT is made on the metallized bottom face of the PZT, which constitutes the PZT's positive electrode, by connecting a wire to the PZT face by conductive adhesive.

SUMMARY OF THE INVENTION

The present invention is of structures and methods for mechanically and electrically bonding the microactuator(s) in a DSA type suspension to the rest of the suspension. The structures and methods of the invention provide for greater stroke than with prior structures and methods. The term "stroke" or "stroke length" as used herein is shorthand for the amount of linear expansion or contraction of the portion of the suspension moved by the microactuator in response to a given amount of input driving voltage to the microactuator. Stroke is thus expressed in units of length/volt. For PZT microactuators, stroke is usually expressed in nm/V.

The inventors of the present application have discovered that in a typical prior art DSA suspension such as the Hanya et al. suspension, stroke length was being lost due to elastic deformation of the adhesives used to mechanically and electrically bond the PZT to the microactuator plate. The inventors discovered that by adding additional strong adhesive such as epoxy to additionally anchor the PZT to the microactuator plate, the microactuator stroke can be increased. The invention is thus of a DSA suspension with improved stroke length.

According to one embodiment of the invention, a DSA suspension has a first and proximal portion, a second and distal portion, and a microactuator such as a PZT device mounted between the proximal and distal portions. The microactuator is mounted to the proximal portion and to the distal portion via first and second dispensations or masses of non-conductive adhesive. The PZT has a face that constitutes the ground electrode or negative electrode for the device. The ground connection is made by a dispensation or mass of electrically conductive adhesive that bridges a first gap between the top and generally horizontal face of the PZT device and an electrical ground top portion of the suspension that is adjacent to and generally coplanar with the PZT, or at least close to the PZT, such that the conductive adhesive touches both the negative electrode of the PZT and a ground portion of the suspension such as the stainless steel body of either the base plate or some other portion of the suspension that is adjacent or at least close to the PZT. The conductive adhesive is preferably a conductive polymer such as silver-containing conductive epoxy. The non-conductive adhesive is preferably a non-conductive polymer such as non-conductive epoxy. The suspension has third and fourth dispensations or masses of non-conductive epoxy that further anchor the PZT to respectively adjacent portions of the suspension, the third masses of non-conductive epoxy also bridging the first gap between the PZT and an adjacent first portion of the suspension at a first longitudinal end of the PZT, and the fourth mass of non-conductive epoxy bridging a second gap between the PZT and a respectively adjacent portion of the suspension at a second longitudinal end of the PZT opposite the first longitudinal end of the PZT. The third mass of non-conductive adhesive at least partly directly overlays the conductive adhesive. The first and second masses of non-conductive adhesive at least partially fill the two respective gaps, and preferably anchor the PZT to portions of the suspension that define opposed PZT mounting shelves that are integrally formed in the baseplate. The non-conductive epoxy is not intended as an anti-particulate shedding cover and therefore need not, and preferably does not, substantially cover the lateral sides of the PZT. During manufacture and assembly, the first and second masses of non-conductive adhesive are cured in a first curing step; the non-conductive adhesive is cured in a second curing step; and the third and fourth masses of non-conductive adhesive are cured in a third and final adhesive curing step, the three curing steps being all separate. The third and fourth masses of non-conductive epoxy cover enough of the top face of the microactuator so as to anchor it to the suspension, but not so much that the epoxy significantly inhibits the expansion and contraction of the microactuator itself. Preferably, the non-conductive epoxy covers a maximum of about 60% of the face of the microactuator.

In another aspect of the invention, the invention is of a method for mechanically and electrically affixing one or more microactuators such as PZT microactuators within a DSA suspension, the method providing improved microactuator stroke length, the method including affixing a microactuator to the suspension using a first non-conductive curable adhesive and then curing the first non-conductive curable adhesive, providing a ground connection for the microactuator by applying a conductive curable adhesive to a first electrode of the microactuator such that the conductive curable adhesive extends between the first electrode and a metallic portion of the suspension, and then curing the conductive curable adhesive, applying additional non-conductive curable adhesive to the microactuator such that the additional non-conductive curable adhesive extends between a first face of the microactuator on which the first electrode is located, and an adjacent ground portion of the suspension, the additional non-conductive curable adhesive extending at least partly over and directly on the cured conductive adhesive, and then curing the additional non-conductive adhesive.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

DSA suspensions that include microactuators to provide secondary actuation are, by themselves, well known. The most common type of microactuators used in DSA suspensions are piezoelectric, and more specifically lead zirconate titanate (PZT). For simplicity of discussion, the disclosure below will sometimes refer to the microactuator simply as a "PZT." However, other types of microactuators including electrostatic microactuators have been proposed, and the invention as described below is not limited to the use of any particular type of microactuator.

Furthermore, although one preferred embodiment is presented below in which the microactuators are located within a structure that is integral to the baseplate, as is commonly known, microactuators can be located at other locations on the suspension, including without limitation on the load beam, as part of the gimbal itself, and even directly underneath the magnetic head slider. Accordingly, it will be understood that the invention is not limited to DSA suspensions in which the microactuators are mounted at or on a structure that is integral to the baseplate.

Figure 1:
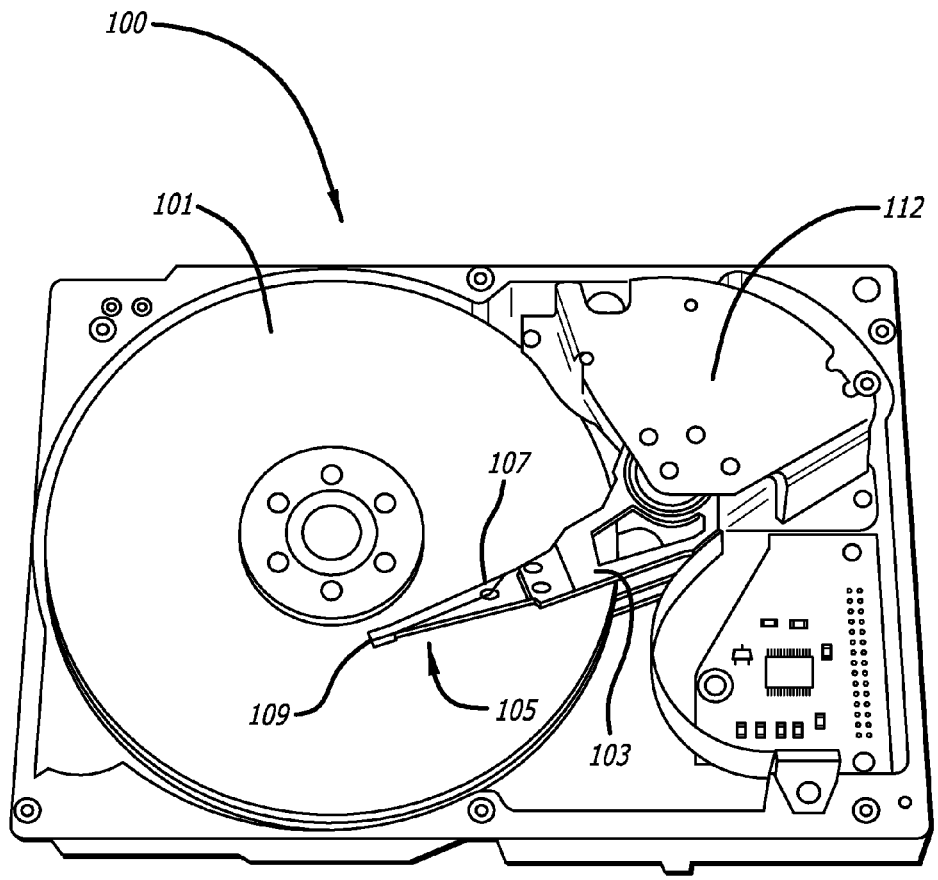
FIG. 1 is an oblique view of a hard disk drive assembly of the prior art.
Figure 2:
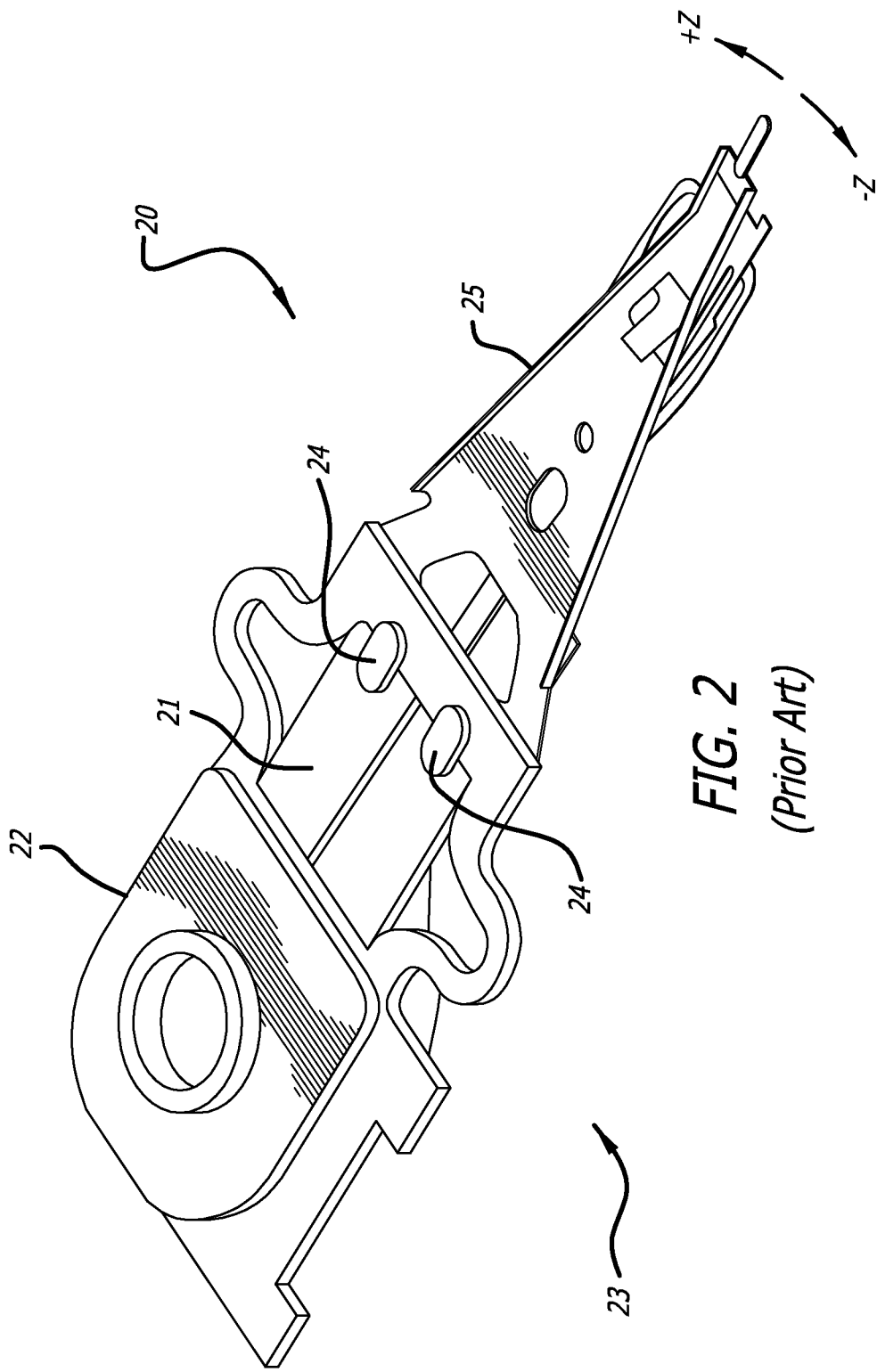
FIG. 2 is an oblique view of a DSA suspension of the prior art.
Figure 3:
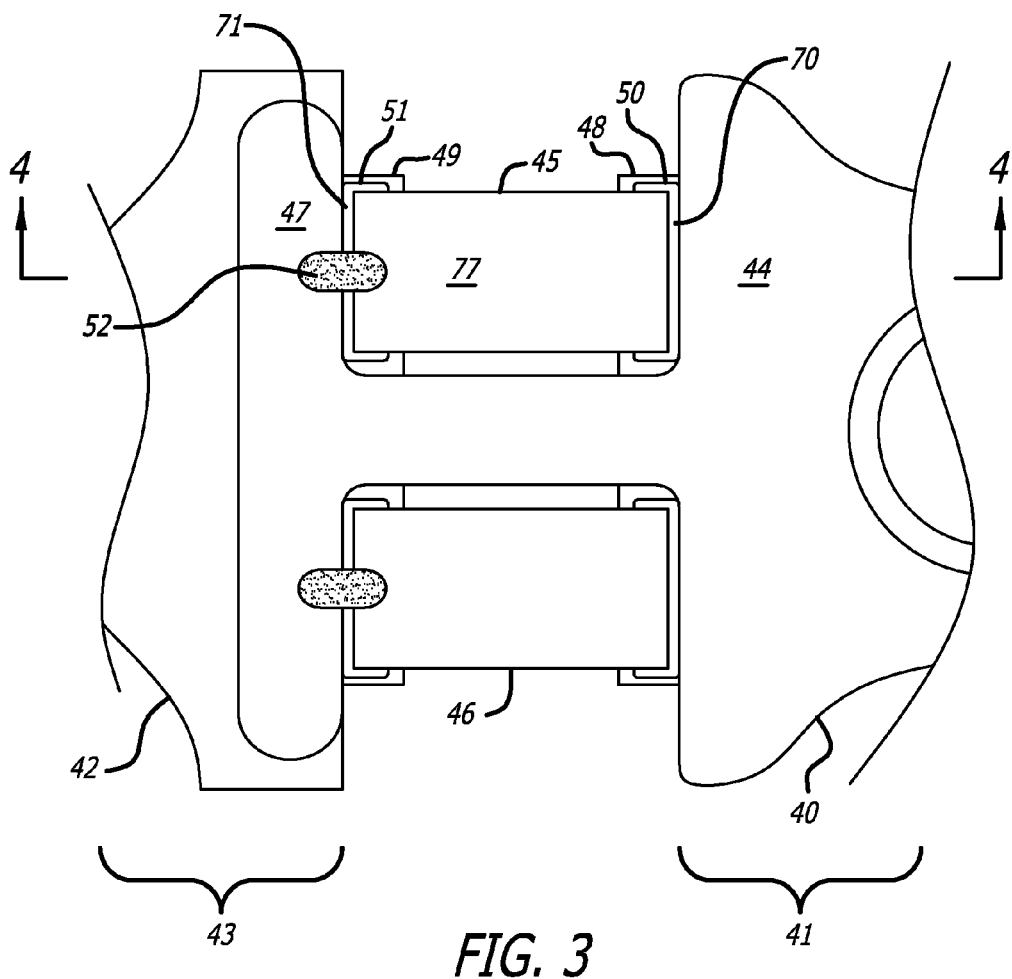
FIG. 3 is a top plan view of a DSA suspension according a first embodiment of the invention in the area around the microactuators, before the final non-conductive adhesive has been added.
Figure 4:
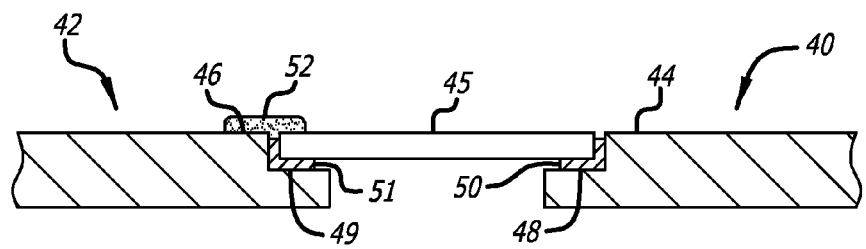
FIG. 4 is a side cutaway view of the suspension of FIG. 3 taken along the section line 4-4.

FIG. 3 is a top plan view of a DSA suspension according a first embodiment of the invention in the area around the microactuators, before the final non-conductive adhesive has been added, and FIG. 4 is a side cutaway view of the suspension of FIG. 3 taken along the section line 4-4. Left and right side PZT microactuators 45 and 46 are arranged in push-pull fashion within a projecting portion of baseplate 40 that forms a microactuator mounting region. The microactuator mounting region includes microactuator mounting shelves 48 and 49 preferably formed integral to baseplate 40 such as by etching. The microactuator mounting region includes a proximal portion 41 of the suspension, and a distal portion 43 of the suspension. As used herein, the term "proximal" merely designates the portion of the suspension that lies proximal of the PZTs, i.e., closer to the place on the suspension at which suspension 105 is mounted to actuator arm 103 in FIG. 1. Similarly, the term "distal" merely designates the portion of the suspension that lies distal of the PZTs, i.e., closer to the far end of the suspension at which the magnetic head slider 109 is mounted to suspension 105 in FIG. 1. In the illustrative embodiment, the load beam (not shown) is connected to the hinge or spring 42 that supports the load beam.

Top face or surface 77 of PZT 45 is typically metallized, and defines a negative electrode of PZT 45. The opposite face (not shown) is also metallized and defines the positive electrode of PZT 45. A positive voltage source that defines the driving voltage for PZT 45 is electrically connected to the positive electrode by any of various previously known techniques including bonding either a wire or an extension of the suspension's flexible circuit (not shown) to the positive electrode. Those techniques are well known and will not be described herein.

A first dispensation or mass 50 of nonconductive adhesive secures a proximal end PZT 45 to proximal portion 41 of the suspension at baseplate 40, and more particularly on PZT proximal mounting shelf 48. A second dispensation or mass 51 of nonconductive adhesive secures a distal end of PZT 45 to distal portion 43 of the suspension on PZT distal mounting shelf 49. Preferably first mass 50 of non-conductive adhesive at least partially fills gap 70 between the proximal end of PZT 45 and its adjacent generally vertical face of the suspension, and second mass 51 of non-conductive adhesive at least partially fills gap 71 between the distal end of PZT 45 and its respectively adjacent generally vertically face of the suspension. Preferably after the first and second masses of nonconductive adhesive 50, 51 have been dispensed and microactuator 45 placed thereon, the non-conductive adhesive is cured.

A third dispensation or mass 52 of adhesive, this time conductive adhesive, is then dispensed such that it lies partly on top face 47 of the distal portion of the suspension, and partly on top face 77 of the PZT, and bridges the gap therebetween. Conductive adhesive 52 provides an electrically conductive ground path from the PZT's negative electrode, or ground electrode, to a ground portion of the suspension. That ground portion will typically be a bare metallic portion of the suspension, which typically is made of stainless steel, including possibly any etchings into and/or coatings on the stainless steel surface that were applied to that stainless steel surface, or other surface preparations of the stainless steel, in order to render that stainless steel surface more conducive to forming a good electrical bond with the conductive adhesive used.

When suspension 105 is mounted to actuator arm 103, the electrical path to ground is completed through actuator arm 103. The locus where the conductive adhesive 52 contacts top face 47 of the suspension thus defines a grounded locus on the suspension.

Figure 5:
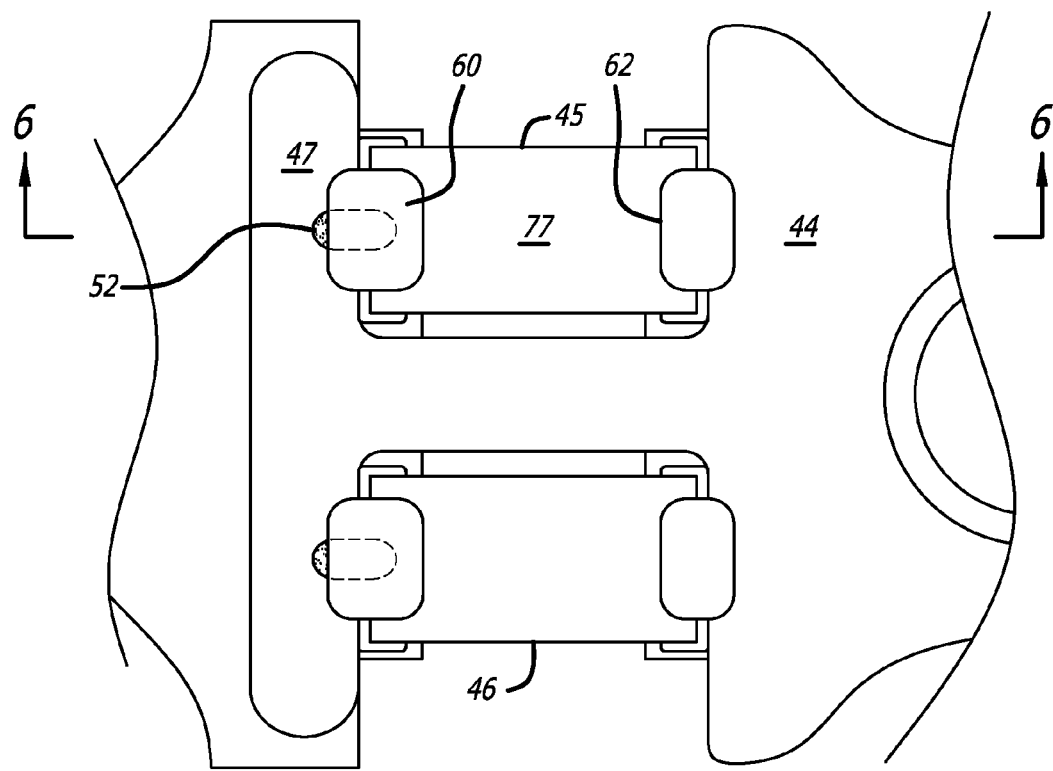
FIG. 5 is a top plan view of the DSA suspension of FIG. 3, after the final non-conductive adhesive has been added.
Figure 6:
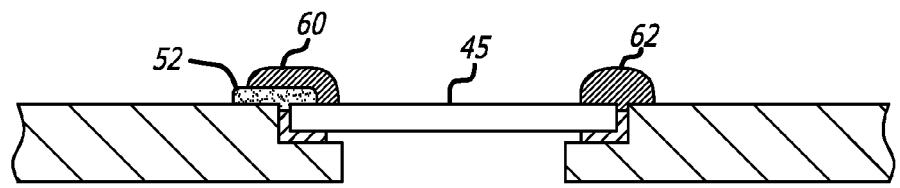
FIG. 6 is a side cutaway view of the suspension of FIG. 5 taken along the section line 6-6.

FIG. 5 is a top plan view of the DSA suspension of FIG. 3, after the final non-conductive adhesive has been added, and FIG. 6 is a side cutaway view of the suspension of FIG. 5 taken along the section line 6-6. According to the invention, a third dispensation or mass 60 of non-conductive adhesive is added, preferably lying at least partly on conductive adhesive 52, and preferably although not necessarily directly on conductive adhesive 52, and preferably still after conductive adhesive 52 has either partly or completely cured. Mass 60 of non-conductive adhesive also bridges gap 71 at the distal portion 43 of the suspension, as does conductive adhesive 52, and further anchors PZT 45 to the respectively adjacent distal portion 43 of the suspension. Similarly, mass 62 of non-conductive adhesive bridges gap 70 at the proximal portion 41 of the suspension, and further anchors PZT 45 to that respectively adjacent proximal portion 41 of the suspension. Second gap 71 is located opposite first gap 70 relative to microactuator 45. In one embodiment of the invention therefore, the first and second masses 50 and 51 of non-conductive adhesive are cured in a first curing step, the mass of conductive adhesive 52 is cured in a second curing step, and the third and fourth masses 60 and 62 of non-conductive adhesive are cured in a third and final curing step, those three curing steps being separate curing steps, where the non-conductive adhesive 60, being epoxy in the illustrative embodiment, is dispensed in a flowable form at least partly on conductive epoxy 52 and partly on microactuator 45, and then cured thereat.

The non-conductive adhesive is preferably a thermosetting polymer such as epoxy. The conductive adhesive is preferably a thermosetting polymer such as silver containing epoxy. Conductive silver epoxies are well known.

Masses 60 and 62 of non-conductive adhesive preferably cover a minimum of about 25%, and preferably maximum of about 60%, and more preferably a maximum of about 50%, of the top surface of PZT 45, in order to avoid overly restricting the linear expansion and contraction of PZT 45. The non-conductive adhesive 60, 62 preferably does not extend substantially over lateral sides of PZT 45, and preferably covers a maximum of about 25% of the area on the lateral sides of the PZT. However, non-conductive adhesive 60, 62 could be applied not only on the top surface of PZT 45 to help anchor the PZT to the rest of the suspension, but could theoretically also be applied to the lateral sides of PZT 45 so as to substantially cover those lateral sides, as an encapsulation coating to prevent the PZT from shedding contaminating microparticles during operation which could come between the magnetic head slider and the disk platter surface and thereby damage the disk drive.

Preferably the horizontal top face 77 of PZT 45 is coplanar, or nearly coplanar, with adjacent horizontal top faces 44 and 47 of the suspension.

In an alternative embodiment (not illustrated), conductive epoxy 52 could be replaced by some other conductive path, including without limitation a wire or virtually any other electrical conductor. The wire could theoretically be bonded to the PZT and the stainless steel suspension by soldering, by thermosonic bonding, or by other means. Conductive epoxy 52 is currently contemplated as being the preferred embodiment for the ground path.

Manually applying the additional masses 60, 62 of non-conductive adhesive on top of the PZT was generally found to be superior to attempting to use the existing equipment which automatically dispenses the conventional masses 50, 51 of non-conductive adhesive and making that same equipment dispense the additional masses 60, 62. It was generally found that assembly personnel could better control the placement, volume, and flow of the additional masses 60, 62 of non-conductive adhesive using manual dispensation rather than automatic dispensation. It is expected that the assembly equipment will be modified in the near future so as to automatically dispense the second masses 60, 62 with sufficient control, so that automatic equipment will be used in the future to dispense the extra non-conductive adhesive.

Figure 7:
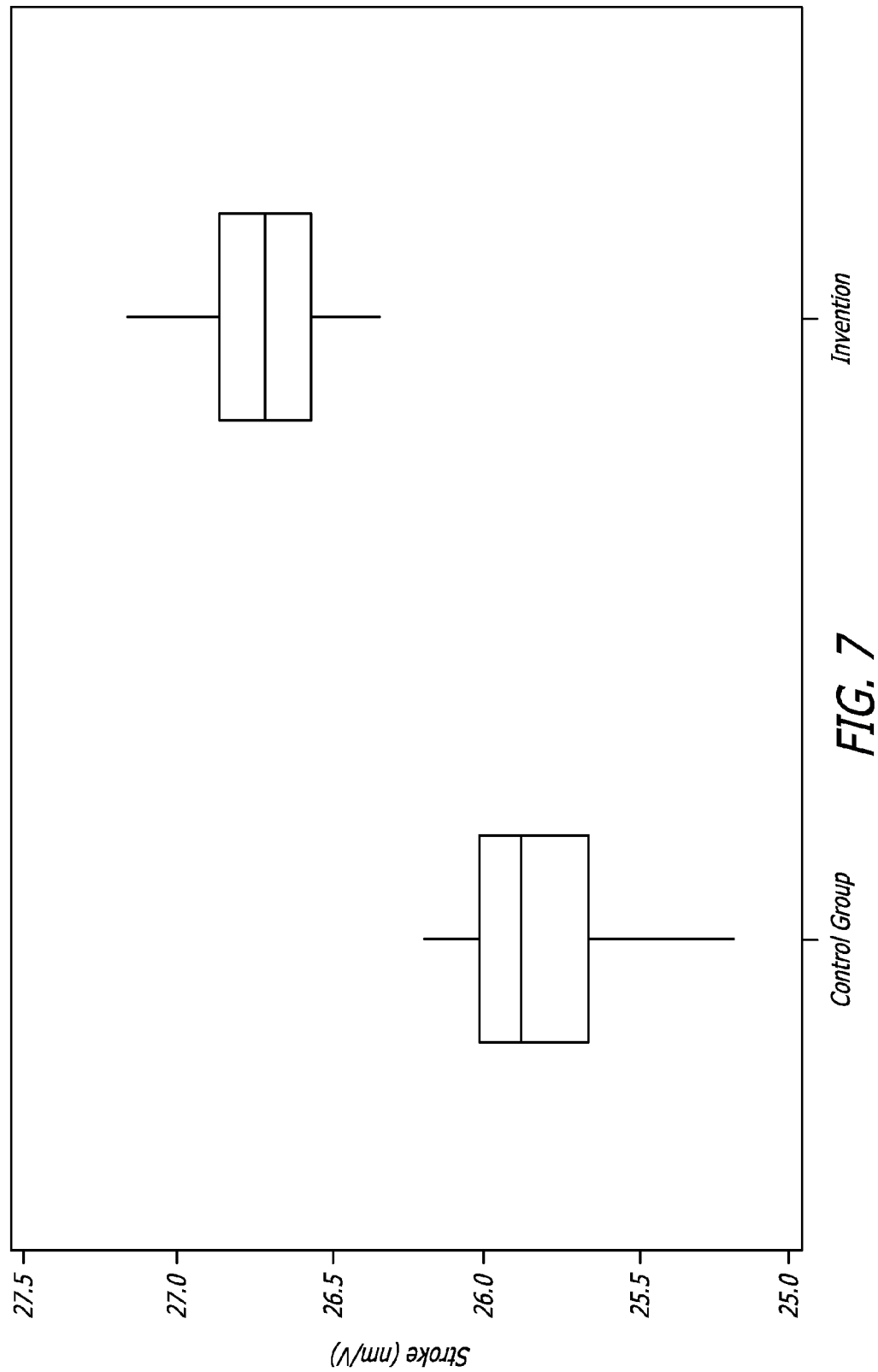
FIG. 7 is a boxplot showing test results for both a suspension according to a prior design and for a suspension according to the present invention.

FIG. 7 is a boxplot of test results showing stroke length in nm/V, for a DSA suspension constructed with the conductive adhesive as the last step such as in FIGS. 3 and 4 as the control group, and with a DSA suspension of the present invention as shown in FIGS. 5 and 6, i.e., having the novel additional non-conductive adhesive applied to the top of the PZT using manual application of the second adhesive. The numerical results in units of nm/V are given below.

| Product Description | Mean Stroke | Standard Deviation | Standard Error of the Mean |
|---|---|---|---|
| Control Group | 25.837 | 0.286 | 0.090 |
| Invention using manual dispensation | 26.749 | 0.231 | 0.073 |

In sum, by applying a secondary non-conductive adhesive step (after the conductive adhesive is applied), the inventors were able to achieve an increase in stroke performance of approximately 0.9 nm/V, bringing the stroke length to approximately 26.7 nm/V. The invention therefore represents a significant improvement over the previously practiced structure and method for mechanically and electrically securing PZT microactuators within a DSA suspension.

It will be understood that the terms "generally," "approximately," "about," "substantially," and "coplanar" as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," "below," "horizontal," "vertical," and the like as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention.

For example, the present invention has been described with respect to a DSA suspension in which the microactuators are mounted to the base plate or to an actuator plate that is integral with the base plate. As is well known in the art, microactuators can be placed at various locations on a suspension, including: on the base plate or integral therewith; on the load beam or integral therewith; on the gimbal or integral therewith, including near or underneath the head slider. It will be understood, therefore, that the invention is not limited to the microactuator being located on, near, or integral with, any particular part of the suspension, or even in any particular construction of the suspension itself.

The present invention has also been described with reference to a microactuator of the PZT type. However, as is well known in the art, other types of microactuators can be used including electrostatic microactuators. It will be understood therefore, that the invention is not limited to the microactuator being of any particular type or construction. The present invention has also been described with reference to a magnetic hard disk drive. However, it will be understood that the invention is not limited to magnetic hard disk drives, and is applicable to suspensions for other types of data drives such as optical disk drives.

Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage actuated (DSA) suspension for a disk drive, the suspension comprising:
    a first and proximal portion attached to an actuator arm;
    a second and distal portion to which a head slider is mounted;
    a microactuator mounted between the proximal portion and the distal portion;
    a first mass of non-conductive adhesive mechanically affixing the microactuator to the suspension;
    a conductive adhesive electrically connecting an electrode of the microactuator to a ground portion of the suspension, the conductive adhesive extending over and bridging a horizontal gap that horizontally separates a horizontal surface of the microactuator from an adjacent horizontal surface of the suspension, the conductive adhesive extending onto the horizontal surface of the microactuator;
    a second mass of non-conductive adhesive additionally mechanically affixing the microactuator to the suspension, the second mass of non-conductive adhesive at least partly and directly overlaying the conductive adhesive and being separated from the horizontal gap by the conductive adhesive, the second mass of nonconductive adhesive extending onto and over said horizontal surface of the suspension and directly bonding thereto.

2. The suspension of claim 1 wherein the conductive adhesive comprises conductive epoxy, and the first and second masses of non-conductive adhesive each comprise non-conductive epoxy.

3. The suspension of claim 1 wherein the gap is at least partially filled with said first mass of non-conductive adhesive.

4. The suspension of claim 1 wherein the second mass of non-conductive adhesive that overlies the conductive adhesive does not extend substantially over lateral sides of the microactuator.

5. The suspension of claim 1 wherein the microactuator is a PZT device.

6. The suspension of claim 1 further comprising a third mass of non-conductive adhesive, the third mass of non-conductive adhesive bridging a second gap between the microactuator and an adjacent portion of the suspension, the second gap being located opposite the first gap relative to the microactuator.

7. The suspension of claim 1 wherein the first and second masses of non-conductive adhesive and the conductive adhesive are all separately cured.

8. The suspension of claim 1 wherein a top surface of the microactuator is generally coplanar with an adjacent top surface of the suspension.

9. The suspension of claim 1 wherein the microactuator is mounted to a pair of opposed microactuator mounting shelves formed integral with a baseplate of the suspension.

10. The suspension of claim 1 in combination with a data disk and a motor for rotating the data disk, the head slider being arranged to read data from the data disk.

11. A dual stage actuated (DSA) suspension for a disk drive, the suspension comprising:
    a proximal portion attached to an actuator arm;
    a distal portion to which a head slider is mounted;
    a microactuator disposed on said suspension and mounted between the proximal portion and the distal portion of the suspension and affixed to each of said portions;
    a conductive ground path comprising conductive polymer extending between a first and generally horizontal surface of the microactuator and a grounded flat surface on at least one of said portions, the first surface of the microactuator and the grounded flat surface of the suspension being separated by a horizontal gap;
    a non-conductive polymer disposed on said first surface of the microactuator and extending across the gap and onto and over the grounded flat surface of the suspension and bonded directly to said grounded flat surface of the suspension.

12. The suspension of claim 11 wherein the non-conductive polymer lies at least partly directly on top of said conductive ground path.

13. The suspension of claim 11 wherein the conductive polymer comprises conductive epoxy.

14. The suspension of claim 13 wherein the conductive adhesive comprises conductive epoxy, and the non-conductive polymer was cured after being dispensed in a flowable form at least partly on the conductive epoxy and partly on the microactuator and cured thereat.

15. The suspension of claim 14 wherein non-conductive polymer is disposed at a first end of said microactuator at which the conductive polymer is located, and also at a second end of the microactuator longitudinally opposite the first end, and at each of the first and second microactuator ends the non-conductive epoxy bridges respective gaps between the respective microactuator end and the suspension.

16. The suspension of claim 15 further comprising non-conductive epoxy disposed between a second surface of the microactuator opposite the first surface, and a mounting shelf of the suspension.

17. The suspension of claim 15 wherein the non-conductive polymer covers at least 25% of the first surface of the microactuator.

18. The suspension of claim 11 wherein the microactuator comprises a piezoelectric element.

19. A dual stage actuated (DSA) suspension for a disk drive, the suspension comprising:
    a first and proximal portion attached to an actuator arm;
    a second and distal portion to which a head slider is mounted;

a microactuator mounted between the proximal portion and the distal portion, the microactuator having a top surface thereof;

a conductive adhesive electrically connecting an electrode of the microactuator to a ground portion of the suspension;

a non-conductive adhesive mechanically affixing the microactuator to the suspension, the non-conductive adhesive at least party overlaying the conductive adhesive, the non-conductive adhesive covering at least 25% of the top surface of the microactuator.

\* \* \* \* \*